United States Patent [19]

Connor

[11] Patent Number: 4,479,172

[45] Date of Patent: Oct. 23, 1984

[54] ILLUMINATED MIRROR ASSEMBLY

[76] Inventor: John Connor, c/o Clearplas Limited, Bayton Rd., Exhall, Coventry, England, CV7 9EL

[21] Appl. No.: 441,739

[22] Filed: Dec. 2, 1982

[30] Foreign Application Priority Data

Nov. 13, 1981 [GB] United Kingdom ............... 8134348
Feb. 17, 1982 [GB] United Kingdom ............... 8204657
Apr. 2, 1982 [GB] United Kingdom ............... 8209820

[51] Int. Cl.³ .................... F21V 33/00; B60Q 3/02
[52] U.S. Cl. ............................... 362/135; 362/74; 362/141; 362/240; 362/299; 362/301; 362/328; 362/330; 362/346; 362/364; 362/245
[58] Field of Search ............... 362/144, 299, 346, 300, 362/301, 328, 140, 141, 135, 333, 142, 128, 129, 74, 133, 137, 136, 382, 249, 240, 245; 296/97 H; 174/126 CS

[56] References Cited

U.S. PATENT DOCUMENTS

| 2,748,263 | 5/1956 | Franck et al. | 362/333 |
| 3,641,334 | 2/1972 | Kipping | 362/137 X |
| 4,075,468 | 2/1978 | Marcus | 362/144 |
| 4,353,592 | 10/1982 | Cziptschirsch | 296/97 H |
| 4,364,597 | 12/1982 | Viertel et al. | 362/137 X |

FOREIGN PATENT DOCUMENTS 1162344 9/1958 France ............... 362/140

Primary Examiner—Richard E. Schafer
Assistant Examiner—John S. Maples
Attorney, Agent, or Firm—Gifford, VanOphem, Sheridan, Sprinkle & Nabozny

[57] ABSTRACT

A mirror assembly comprising a shallow dish-like housing containing at least one pair of elongate conductors together defining an electrically-conductive seating for at least one electric lamp to be mounted therebetween within the housing, the conductors extending with the interior of the housing to terminal connectors, whereby connection to an electrical supply externally of the housing can be effected, a frame or bezel detachably secured around the periphery of the housing and defining a first aperture closed by a mirror facing outwardly of the housing and at least one second aperture containing a lens through which light from the or each lamp, when energized, will be so directed as to illuminate a region in front of the mirror. The mirror is spaced from the base of the housing and the rear surface of the mirror. At least part of the internal surfaces of the housing are reflective, whereby light emitted by the lamp or lamps is reflected at least once before passing through the lens or lenses to be directed thereby to said region in front of the outer face of the mirror.

2 Claims, 6 Drawing Figures

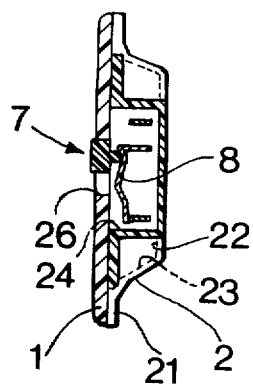
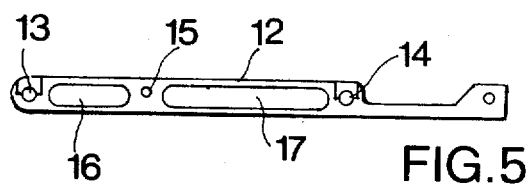
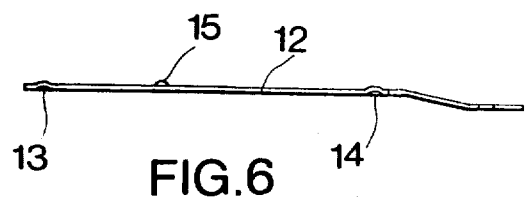

ILLUMINATED MIRROR ASSEMBLY

The invention relates to an illuminated mirror assembly of the kind fitted with at least one electric lamp for illuminating an object positioned close to the mirror. The invention is particularly, but not exclusively, concerned with such a mirror assembly for mounting at the back of a sun visor for a vehicle to provide a so-called vanity mirror. The term "back" is used herein to refer to that face of the visor which in its operative position will be facing to the rear of the vehicle and towards a passenger or the driver of the vehicle.

Several types of mirror assemblies for fitting to sun visors and incorporating illuminating lamps have been proposed hitherto. In one such mirror assembly a small electric lamp arranged to be energized by the electrical system of the vehicle is mounted adjacent an edge of the mirror to illuminate a person's face or other object close to the mirror by direct lighting. This known arrangement suffers from the disadvantage that the light is harsh and in the dark will produce dazzle and glare. Another known arrangement is to mount a lamp at each end of a mirror in a housing therefor and to cover the lamp by a diffuser; but such an arrangement does not give sufficient intensity of light in a region in front of the mirror. Yet another known arrangement, with a view to producing a soft light is to surround the mirror with a frame or bezel which is at least partly translucent and is illuminated by an electric lamp or lamps positioned within the mirror assembly. Although this produces illumination around the mirror it does not adequately illuminate a person's face or other object being viewed in the mirror.

An object of the invention is to provide a mirror assembly having at least one electric lamp which provides good illumination of an object positioned close to the mirror and also produces a light directed towards the object substantially without causing glare. While such a mirror assembly is especially suitable for mounting at the back of a sun visor for a vehicle, the invention may have other applications.

As a mirror assembly for mounting in a recess in the back of a sun visor of a vehicle must not protrude very far from the rear face of the sun visor, another object of the invention is to provide such a mirror assembly in which the mirror and the lamp or lamps are provided in a shallow housing which is shaped to be inserted into or moulded in a recess in the sun visor with only a frame or bezel substantially flush with the rear face of the sun visor.

Another object of the invention is to provide a mirror assembly, for mounting in a sun visor of a vehicle, having terminal connections leading within the assembly to the lamp or lamps, whereby the mirror assembly can readily be connected to the electrical system of the vehicle.

According to the invention, a mirror assembly comprises a shallow dish-like housing containing at least one pair of elongate conductors together defining an electrically-conductive seating for at least one electric lamp to be mounted therebetween within the housing, the conductors extending within the interior of the housing to terminal connectors, whereby connection to an electrical supply externally of the housing can be effected, a frame or bezel detachably secured around the periphery of the housing and defining a first aperture closed by a mirror facing outwardly of the housing and at least one second aperture containing a lens through which light from the or each lamp, when energized, will be so directed as to illuminate a region in front of the mirror, the mirror being spaced from the interior of the base of the housing and rear surface of the mirror and at least part of the internal surfaces of the housing being reflective, whereby light emitted by the lamp or lamps is reflected at least once before passing through the lens or lenses to be directed thereby to said region in front of the outer face of the mirror.

Preferably, the lamp or lamps are positioned between the mirror and the base of the housing directly behind the mirror.

Internal peripheral surfaces of the housing may be made reflective and so inclined as to direct light received from the or each lamp towards the lens or lenses.

The or each lens may be made of a transparent, translucent or "frosted" plastics material and be shaped to provide the required directional effect. Where the lens or lenses are translucent or "frosted", the lamps may have a clear envelope and, where the lens or lenses are transparent, the lamps may be of a "frosted" or non-glare type.

The or each lens may have a set of flutes or ridges formed on at least one face thereof. The flutes or ridges may be straight or curved and where there are flutes or ridges on both faces they may be aligned in the same direction in each face or the flutes or ridges in one face may be aligned at an angle, for example 90°, to those in the opposite face. By using curved flutes or ridges on at least one face of the or each lens, a curved or elliptical illuminated region can be produced. The flutes or ridges may form a lens of a Fresnel type by which the band of light directed by the lens can be made divergent, parallel-sided or convergent according to the light pattern required.

The combination of a directional lens or lenses and a lamp or lamps, or both, which is translucent or "frosted" will provide a desired uniform, non-glare illumination in the region in front of the mirror.

The reflective internal surfaces of the housing and the reflective rear surface of the mirror together with the lens or lenses provide the required direction and region of uniform illumination and intensity of illumination.

The internal surfaces of the housing and the rear surface of the mirror may be made reflective by mettalizing or by the attachment thereto of a reflective metallic sheet. The latter, where used, would also act to dissipate radiant heating produced by the lamp or lamps.

The conductors may be metallic strips, and desirably these may be non-reflective. For example, they may be of phosphor bronze.

The internal surfaces of the housing although reflective may be white in color to improve the intensity of light reflected thereby.

Preferably, the mirror is made of a plastics material which is suitably metalized to provide the outwardly-directed mirror surface and which may also be metalized or clad with reflective metallic sheet to provide the internal reflective surface.

The housing and the frame or bezel may also be made of plastics materials and may be provided with deformable locating and retaining means enabling them to be assembled and to be readily separated to enable a lamp or lamps to be replaced.

The frame or bezel may also support a switch having contacts by which a series circuit may be opened and closed between the contacts defining the seating for the lamp or lamps and the terminal connectors.

The invention also includes the combination of a sun visor for a vehicle and a mirror assembly located in a shallow recess in the back (as hereinbefore defined) of the sun visor, the mirror assembly being in accordance with any one of the immediately preceding thirteen paragraphs.

Some known illuminated mirror assemblies for sun visors include a manually-operated switch or an automatic switch, or both in series, which are closed when the visor has been swung to its operative position and which are intended to be opened when the visor has been swung to its stowed position.

Such known illuminated mirror assemblies suffer from the disadvantages that an automatic switch can jam or otherwise fail in the closed position or a manual switch could inadvertently be left on when the visor has been swung to its stowed position. Where either switch is provided, it could remain closed when the visor is in its stowed position, or where both switches are provided in series, it would still be possible for the automatic switch to fail in the closed position and for the manual switch to be inadvertently left closed when the visor is in its stowed position. This would mean that the lamp or lamps would be left on when the visor is in its closed position, thereby consuming electrical energy unnecessarily; but what is more serious, there would be a risk of overheating causing damage or even a fire, because the lamps are usually mounted in an enclosed and well-insulated housing of small volume.

A further object of the invention is to provide an illuminated mirror assembly by which a sufficient degree of illumination can be achieved by using a lamp or lamps requiring a smaller power input than those used hitherto. For example in a known illuminated mirror assembly two 3 watt lamps have been used hitherto to achieve a required degree of illumination. With the illuminated mirror assembly provided by this invention the same degree of illumination can be achieved by using two 2 watt lamps.

This results in less risk of flattening of the battery and in a lower operating temperature, which reduces the risk of damage or fire, should the visor be moved to its stowed position with the lamps remaining in their "on" mode.

According to a feature of the invention, an illuminated mirror assembly comprises a shallow dish-like housing containing a pair of elongate conductors together defining an electrically-conductive seating for at least one electric lamp to be mounted therebetween within the housing, the conductors extending to terminal connectors, whereby connection to an electrical supply externally of the housing can be effected, a frame or bezel detachably secured around the periphery of the housing and defining a first aperture closed by a mirror facing outwardly of the housing and at least one second aperture containing a lens through which light from the or at least one lamp, when energized, will be so directed as to illuminate a region in front of the mirror, the mirror being spaced from the interior of the base of the housing and the lamp or lamps being positioned between the mirror and the base of the housing directly behind the mirror, the rear surface of the mirror and at least part of the internal surfaces of the housing being reflective, whereby light emitted by the lamp or lamps is reflected at least once before passing through the lens or lenses, the conductors having apertures therein to permit incident or reflected light to pass through the conductors.

By way of example, a mirror assembly for insertion into a shallow recess in the back of a sun visor of a vehicle will now be described with reference to the accompanying drawings, in which:

FIG. 4 is a section through the complete mirror assembly on the line IV—IV in FIG. 2;

FIG. 5 is a side view of a modified conductor strip to be used in place of the conductor strips shown in FIGS. 2 and 3, and FIG. 6 is a plan view of the conductor strip shown in FIG. 5.

Figure 1:
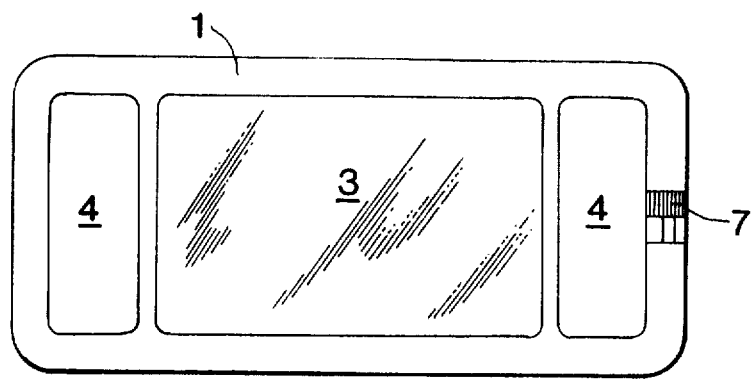
FIG. 1 is a front view of the mirror assembly as seen from the back of the visor when the assembly is fitted therein.
Figure 2:
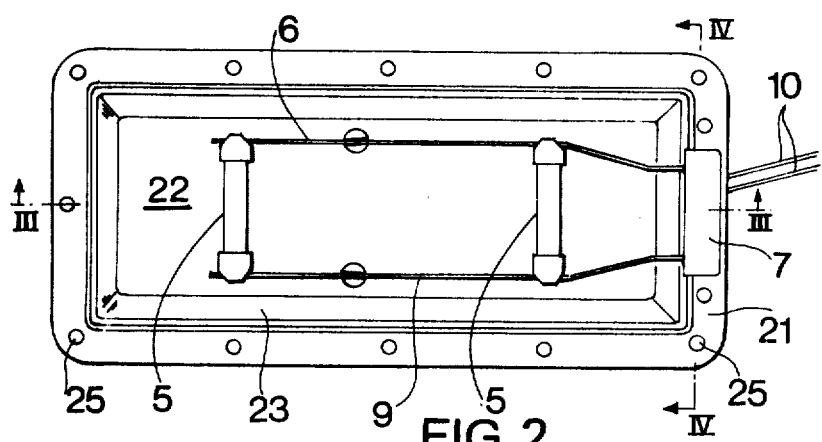
FIG. 2 is a view of the mirror assembly looking in the same direction as FIG. 1 but with the aforesaid frame or bezel, the mirror and the lenses removed.
Figure 3:
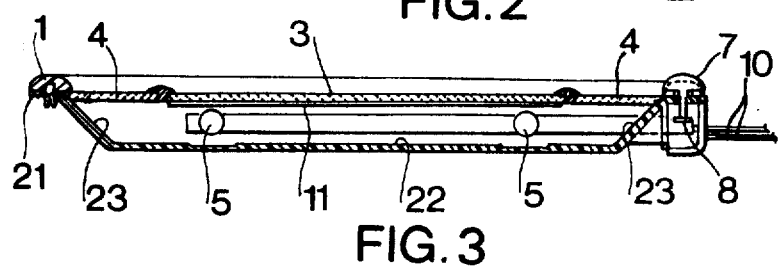
FIG. 3 is a section through the complete mirror assembly on the line III—III in FIG. 2.

The mirror assembly shown in FIGS. 1-4 comprises a shallow dish-like housing 2 which is shaped to be inserted into the recess in the back of the visor (not shown) or is molded therein or the visor is molded therearound and has a flange 21 which is substantially flush with the rear face of the visor around the periphery of the recess. The housing is made of a plastics material and has highly light-reflective internal surfaces 22 and 23, which may be white in color and which may be coated by a metallic sheet lining or metalizing. The housing supports a pair of metal strips 6, 9 which together provide electrically-conductive seatings for a pair of cartridge lamps 5, which may be of a frosted or other non-glare type or have a clear envelope. The strips 6, 9 are preferably non-reflective and may be made of phosphor bronze. The strips 6, 9 pass through a wall of the housing into a recess 24 in which a switch contact 8 is mounted. Wires 10 or other terminal connectors extend through the outside of a wall of the recess 24 where they are arranged to be connected to an electrical circuit of the vehicle. The switch contact 8 is moved by a slidable switch button 7 into and out of a position in which a series circuit is completed through the wires 10 and the strips 6, 9 to the lamps 5. By locating the strips 6, 9 in the housing 2 and passing the wires 10 through a wall of the housing 2, no loose wires are present within the housing 2, thereby producing a construction which is simple to assemble and which cannot therefore have an electrical fault caused by the breakage or trapping of a wire.

The housing 2 is fitted with a frame or bezel 1, also of a plastics material which defines a center aperture accommodating a mirror 3, facing outwardly of the housing 2. The mirror 3 is also made of a plastics material. On either side of the centre aperture, the frame or bezel 1 defines an end aperture registering with a lens 4, also made of a plastics material. The frame or bezel 1 is located and retained on the housing 2 by deformable plastics pegs 25 extending from the housing 2 and engaging in sockets in the frame or bezel 1 or vice versa. The frame or bezel 1 may be removed to enable a lamp or lamps 5 to be fitted and then be re-fitted on the housing 2. The mirror 3 is clamped in position by the bezel 1 without distortion of the mirror 3. The lenses 4 are retained in the housing 2 when the frame is removed. This aids the initial assembly of the mirror assembly and also its re-assembly after a lamp 5 has been replaced.

The frame or bezel 1 also carries the switch button 7 which is slidable in a hole 26 thereon and engages the switch contact 8 positioned in the recess 24.

The lenses 4 are conveniently formed with a set of parallel ridges or flutes on one or each face thereof. Where the ridges or flutes are provided on both faces of the elnses 4, the ridges or flutes on one face may lenses 4 parallel to or at an angle, for example at right angles, to those on the other face. The ridges or flutes may be straight or be curved on either face and form a lens of a Fresnel type to produce or enhance the required directional effect. For example, the lenses 4 may produce divergent, parallel-sided or convergent beams of light as required. Where the ridges or flutes in one or both faces of the lenses are curved an elliptical region of illumination in front of the mirror would be produced.

The combination of the reflective interior surface of the housing 2, the frosted or non-glare lamps 5 and the lenses 4 results in uniform, directed, non-glare illumination of an object, e.g., a person's face, close to the mirror 3. The lenses may be translucent or "frosted" and in that case the lamps 5 could have clear envelopes. Alternatively the lens may be transparent and in that case the lamps 5 may preferably be of "frosted" or other non-glare type.

The mirror 3 is spaced from the base 22 of the housing 2 and the lamps 5 and the conductors 6 and 9 are mounted in the space between the mirror 3 and the base 22. Furthermore, the lamps 5 are positioned directly behind the mirror 3 and thus are not in alignment with the lenses 4 except at a very oblique angle. As well as the internal surfaces of the housing 2 being made highly reflective, the rear surface of the mirror 3 is also highly reflective, for example by attaching a metalized sheet 11 all over the back of the mirror 3. Thus most of the light emitted by the lamp 5 is reflected both by the rear surface of the mirror and by the interior surfaces 22 and 23 of the housing 2. Most of the light emitted by the lamps 5 is reflected at least once by each reflective surface in its path to the lenses 4. In most directions of emission, the light is reflected a large number of times. The peripheral internal surfaces 23 of the housing are inclined at angles of approximately 45° to the planes of the base 22 and the mirror 3, thereby to obtain reflection producing an angle of incidence at the lenses 4 necessary to produce the required pattern of light deflection from the lenses 4. Most of the light which is received by the lenses 4 will ultimately have been reflected from the peripheral walls 23 due to the positioning of the lamps 5 behind the mirror 3 and the multiple reflection paths provided by the rear surface of the mirror 3 and the internal surface of the base of bezel 1 housing before reflection from the peripheral walls 23. This arrangement of the lamps and the reflective surfaces and the lenses together produces the required pattern of illumination in front of the mirror and also the required intensity of illumination. The construction also enables the mirror assembly to be thin and so the visor can likewise be thin and thereby cheaper than hitherto.

The frame or bezel 1 and the mirror 3 and lenses 4 are all that is seen of the mirror assembly when the latter has been fitted into the recess in the sun visor. The frame or bezel can be given any colour or finish desired. For example it may be opaque and of a color which will match the colour of covering material of the sun visor. 15, It has been found that the amount of transmission of light from the lamps 5 to the lenses 4 is affected by the conductor strips 6, 9 acting to interrupt incident or reflected light paths to or from the peripheral surfaces 23 of the housing and by the conductor strips 6, 9 being non-reflective. Where the lamps 5 are replaced by lamps of reduced power rating, for example where 3 watt lamps are replaced by 2 watt lamps, the intensity of illumination by light passing through the lenses 4 is considerably reduced. The effective light intensity can be restored or increased, however, by replacing the conductor strips 6, 9 with a pair of strips 12, of which one is shown in FIGS. 5 and 6. Each strip 12 has longitudinally spaced depressions 13, 14 providing a seating for one end of a cartridge lamp such as 5 and a dimple 15 by which the strip is mounted in the housing by a mounting (not shown). Between the depressions 13, 14 and the dimple 25, the strip 12 has apertures formed therein by elongate slots 16, 17. Thus both incident and reflected light directed to or from the reflective surfaces 23 are able to pass through the slots 16, 17, thereby resulting in greater light intensity reaching the lenses 4. Each strip 12, like the strips 6, 9 may be non-reflective.

Although in the mirror assembly shown in FIGS. 1-4, the rear face of the mirror 3 and the base 22 of the housing 2 are reflective, the reflection provided by the base 22 and hence the light intensity at the lenses 4 can be increased by adding a highly-reflective label to the base 22 of the housing 2 in the area between the two strips 12 and extending beneath the lamps 5.

By providing the elongate slots 16, 17 in the conductor strips 12, greater light intensity reaches the lenses 4 and so lower power lamps may be used. This reduces the load on the battery and the risk of heat damage or fire if the visor should be moved to its stowed position with the lamps still on, either due to the manual switch not having been switched off and/or an automatic switch jamming in the closed position, as aforesaid.

Although the mirror assembly illustrated has two lamps 5 positioned behind the mirror 3, a similar mirror assembly could be constructed having only a single lamp, or more than two lamps, behind the mirror, the light from the lamp or lamps being reflected by the reflective surface on the back of the mirror and the internal surfaces of the housing towards the lenses 4.

I claim:

1. A mirror assembly comprising a shallow dish-like housing having a flat base and walls upstanding therefrom around the whole of the periphery of said base, said walls having internal surfaces inclined at an obtuse angle with respect to said base; at least one pair of elongate conductors together defining an electrically-conductive seating for at least one electric lamp to be mounted therebetween within said housing; said conductors extending within the interior of said housing to terminal connectors, whereby connection to an electrical supply externally of said housing can be effected; a frame detachably secured around the periphery of said housing and defining a first aperture; a mirror mounted in said first aperture and facing outwardly of said housing; said frame defining at least one second aperture; a lens mounted in each said second aperture through which light from each said lamp, when fitted between said conductors and energized, is directed by said lens to illuminate a region in front of said mirror, said mirror spaced from the interior of the base of said housing, each said lamp positioned wholly between said mirror and said base of the housing and directly behind the mirror, the rear surface of said mirror and at least said internal surfaces of said walls of said housing being reflective whereby light emitted by each said lamp is reflected at least once before passing through at least one of said lenses to be directed thereby to said region in front of the outer face of said mirror and wherein said electrical conductors include apertures formed therethrough and through which incident and reflected light passes.

2. The combination of a sun visor for a vehicle and a mirror assembly located in a shallow recess in the back of said sun visor, the mirror assembly comprising a shallow dish-like housing having a flat base and walls upstanding therefrom around the whole of the peripheral of said base said walls having internal surfaces inclined at an obtuse angle with respect to said base; at least one pair of elongate conductors together defining an electrically-conductive seating for at least one electric lamp to be mounted therebetween within said housing; said conductors extending within the interior of said housing to terminal connectors, whereby connection to an electrical supply externally of said housing can be effected; a frame detachably secured around the periphery of said housing and defining a first aperture; a mirror mounted in said first aperture and facing outwardly of said housing; said frame defining at least one second aperture; a lens mounted in each said second aperture through which light from each said lamp, when fitted between said conductors and energized, is directed by said lens to illuminate a region in front of said mirror, said mirror spaced from the interior of the base of said housing, each said lamp positioned wholly between said mirror and said base of the housing and directly behind said mirror, the rear surface of said mirror and at least said internal surfaces of said walls of said housing being reflective whereby light emitted by each said lamp is reflected at least once before passing through at least one of said lenses to be directed thereby to said region in front of the outer face of said mirror and wherein said electrical conductors include apertures formed therethrough and through which incident and reflected light passes.

* * * * *

UNITED STATES PATENT AND TRADEMARK OFFICE
CERTIFICATE OF CORRECTION

PATENT NO. : 4,479,172
DATED : October 23, 1984
INVENTOR(S) : John Connor

It is certified that error appears in the above-identified patent and that said Letters Patent is hereby corrected as shown below:

On the Title Page insert:

-- /73/ Assignee: Clesrplas Limited,
   Exhall, Coventry, England --.

Signed and Sealed this

Twenty-seventh Day of August 1985

[SEAL]

Attest:

DONALD J. QUIGG

*Attesting Officer*    *Acting Commissioner of Patents and Trademarks*

UNITED STATES PATENT AND TRADEMARK OFFICE
CERTIFICATE OF CORRECTION

PATENT NO. : 4,479,172
DATED : October 23, 1984
INVENTOR(S) : John Connor

It is certified that error appears in the above-identified patent and that said Letters Patent is hereby corrected as shown below:

On the title page assignee should read

-- (73) Assignee: Clearplas Limited, Exhall, England --.

This certificate supersedes Certificate of Correction issued August 27, 1985.

Signed and Sealed this

Fourteenth Day of October, 1986

[SEAL]

*Attest:*

DONALD J. QUIGG

*Attesting Officer*  *Commissioner of Patents and Trademarks*